US009354076B2

(12) United States Patent
Iwasawa et al.

(10) Patent No.: US 9,354,076 B2
(45) Date of Patent: May 31, 2016

(54) GUIDING SERVER, GUIDING METHOD AND RECORDING MEDIUM RECORDING GUIDING PROGRAM

(71) Applicant: YAHOO JAPAN CORPORATION, Tokyo (JP)

(72) Inventors: Naoki Iwasawa, Tokyo (JP); Miki Hirai, Tokyo (JP); Katsufumi Asai, Tokyo (JP); Shinsuke Itoh, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 1 day.

(21) Appl. No.: 14/201,475

(22) Filed: Mar. 7, 2014

(65) Prior Publication Data
US 2014/0288827 A1  Sep. 25, 2014

(30) Foreign Application Priority Data

Mar. 22, 2013  (JP) ................................. 2013-060624

(51) Int. Cl.
*G01C 21/00* (2006.01)
*G01C 21/36* (2006.01)

(52) U.S. Cl.
CPC ........ *G01C 21/3647* (2013.01); *G01C 21/3697* (2013.01)

(58) Field of Classification Search
USPC ........................................................ 701/522
See application file for complete search history.

(56) References Cited

U.S. PATENT DOCUMENTS

| 2005/0154505 A1* | 7/2005 | Nakamura et al. ................. 701/1 |
| 2013/0141578 A1* | 6/2013 | Chundrlik et al. ............ 348/148 |
| 2013/0169664 A1* | 7/2013 | Strassenburg-Kleciak et al. ............................ 345/589 |

FOREIGN PATENT DOCUMENTS

| JP | 2004-020244 A | 1/2004 |
| JP | 2006-242810 A | 9/2006 |
| JP | 2008-032744 A | 2/2008 |
| JP | 2009-085623 A | 4/2009 |
| JP | 2009-236843 A | 10/2009 |
| JP | 2010-203946 A | 9/2010 |
| JP | 2012-052932 A | 3/2012 |
| JP | 2012-194058 A | 10/2012 |

OTHER PUBLICATIONS

"Cyber Navi AVTC-VH99HUD AVIC-ZH99HUD," [Online], Retrieved Feb. 1, 2013, Internet address: http://pioneer.jp/carrozzeria/cybernavi/avic-vh99hud_avic-zh99hud/) (with partial translation).

(Continued)

*Primary Examiner* — John Q Nguyen
*Assistant Examiner* — Nadeem Odeh
(74) *Attorney, Agent, or Firm* — Oliff PLC (57) ABSTRACT

A guiding server according to this application includes an image storing unit, a retrieving unit, and a generating unit. The image storing unit stores a signboard image of a signboard. The retrieving unit retrieves, from the image storing unit, a signboard image of a signboard on a way to a destination based on location information and destination information of a user terminal. The generating unit generates guiding information including the signboard image based on the retrieved signboard image, the location information and the destination information and transmits the guiding information to the user terminal.

11 Claims, 9 Drawing Sheets

(56) References Cited

OTHER PUBLICATIONS

Aug. 5, 2014 Office Action issued in Japanese Patent Application No. 2013-060624.

Mar. 31, 2015 Office Action issued in Japanese Patent Application No. 2013-060624.

Dec. 15, 2015 Office Action issued in Japanese Patent Application No. 2013-060624.

* cited by examiner

| SIGN-BOARD ID | IMAGE ID | IMAGE DATA | LOCATION INFORMATION | CAMERA-TO-SUBJECT DISTANCE | IMAGE-SHOOTING DIRECTION | ... |
|---|---|---|---|---|---|---|
| 001A | A01 | A01.jpg | N35°39'xx" E139°44'yy" | 30 m | SOUTH | ... |
| 001A | A02 | A02.jpg | N35°39'xx" E139°44'yy" | 50 m | NORTH | ... |
| 002B | B01 | B01.jpg | N35°45'zz" E139°44'yy" | 20 m | SOUTH | ... |
| ... | ... | ... | ... | ... | ... | ... |

| GUIDING FLAG | PATTERN ID | PATTERN | IMAGE ID | LOCATION INFORMATION | ... |
|---|---|---|---|---|---|
| G001 | P01 | R1→X→R2 | B01, D01 | N35°39'29" E139°44'28" | ... |
| G001 | P02 | R1→X→R3 | A01, B01 | N35°39'29" E139°44'28" | ... |
| G001 | P03 | R1→X→R4 | C01, A01 | N35°39'29" E139°44'28" | ... |
| ... | ... | ... | ... | ... | ... |
| G002 | P06 | R2→X→R3 | F01, G01 | N35°39'40" E139°44'10" | ... |
| ... | ... | ... | ... | ... | ... |

FIG.5

| USER ID | MIDWAY GUIDING FLAG | ... |
|---|---|---|
| U001 | G001, G002, ... | ... |
| U002 | G003, G004, ... | ... |
| ... | ... | ... |

GUIDING SERVER, GUIDING METHOD AND RECORDING MEDIUM RECORDING GUIDING PROGRAM

CROSS-REFERENCE TO RELATED APPLICATIONS

The present application claims priority to and incorporates by reference the entire contents of Japanese Patent Application No. 2013-060624 filed in Japan on Mar. 22, 2013.

BACKGROUND OF THE INVENTION

1. Field of the Invention

The present invention relates to a guiding server, a guiding method and a recording medium recording a guiding program.

2. Description of the Related Art

Conventionally, in navigation (hereinafter, also referred to as "guiding") using a mobile terminal or the like, a route to a destination is displayed on a screen of the terminal. Further, there has been proposed a navigation device, with a HUD (Head-up Display), that employs Augmented Reality (AR) that displays route information, a business sign and the like overlapping on the actual scenery. This navigation device creates an AirTag associated with a location to an image taken by a camera and displays the AirTag with the image taken with a camera (for example, see "Cyber Navi AVIC-VH99HUD AVIC-ZH99HUD," [Online], [searched on Feb. 1, 2013]).

The navigation device displays a business or the like by using a business logo, a map symbol or the like as an AirTag. In this case, a user looks for a business or the like by using a signboard as a landmark in actually seen scenery; however, the user sometimes misses the signboard since the image of the signboard is different with a logo or a map symbol. For example, when the user desires to make a right turn by using a business as a landmark, the user may pass though and get lost if the signboard of the business is not seen.

SUMMARY OF THE INVENTION

It is an object of the present invention to at least partially solve the problems in the conventional technology.

According to one aspect of an embodiment, a guiding server includes: an image storing unit configured to store a signboard image of a signboard; a retrieving unit configured to retrieve, from the image storing unit, the signboard image of the signboard existing on a way to a destination based on location information and destination information of a user terminal; and a generating unit configured to generate guiding information including the signboard image based on the retrieved signboard image, the location information, and the destination information and transmit the guiding information to the user terminal.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is an explanatory view illustrating an example of mounting a signboard at an underground mall or the like;

DETAILED DESCRIPTION OF THE PREFERRED EMBODIMENTS

An embodiment for implementing a guiding server, a guiding method and a recording medium recording a guiding program according to this application (hereinafter, referred to as an "embodiment") will be explained in detail with reference to the drawings. However, the guiding server, the guiding method and the recording medium recording the guiding program according to this application are not limited by this embodiment. In the following embodiments, same parts are described with same reference numbers and redundant explanation will be omitted.

1. Outline of Guiding Process

Figure 1:
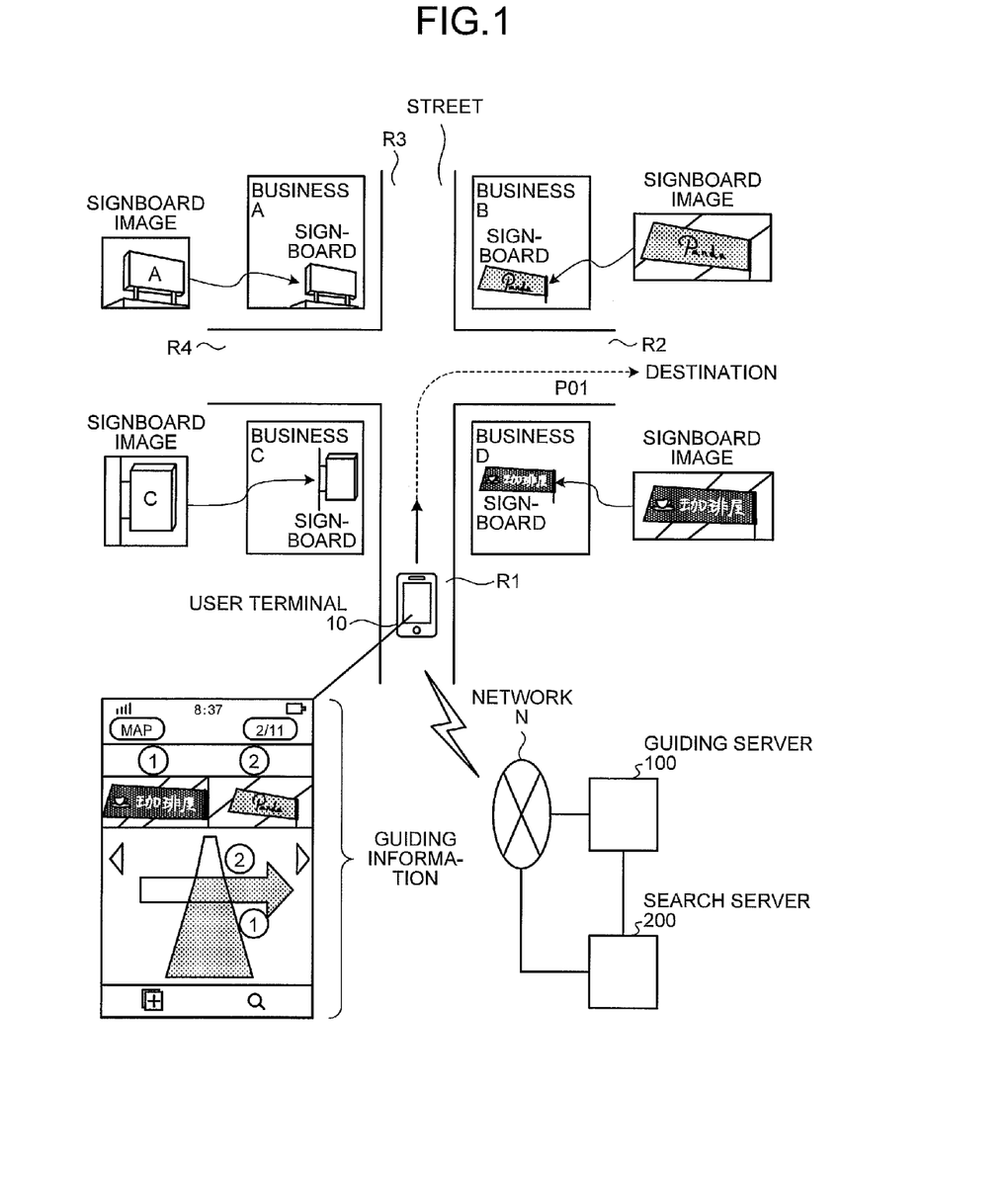
FIG. 1 is an explanatory view illustrating an example of a guiding process according to an embodiment.

Firstly, with reference to FIG. 1, an example of a guiding process according to the embodiment will be explained. FIG. 1 is an explanatory view illustrating an example of a guiding process according to the embodiment. In the example of FIG. 1, a user having a user terminal 10 approaches to a traffic intersection from street R1 and tries to proceed to a destination beyond street R2 as checking guiding information displayed on the user terminal 10.

Firstly, the user operates the user terminal 10 in advance and transmits location information and destination information to a later described search server 200. Receiving the location information and destination information, the search server 200 executes a route search to the destination. The search server 200 starts to transmit route information to the user terminal 10. The search server 200 also starts to transmit the route information to a later described guiding server 100.

Based on the route information, the guiding server 100 sets a guiding flag that indicates the location where guiding information is generated. Here, in the guiding server 100, various locations where guiding flags are set and signboard images of signboards near those locations are previously stored in an image storing unit. Based on the route information, the guiding server 100 retrieves, from the image storing unit, a signboard image of a signboard existing on the route to the destination. The guiding server 100 generates guiding information using the location where the guiding flag is set and the retrieved signboard image.

The user having the user terminal 10 starts to travel toward the destination. The user terminal 10 transmits location information to the guiding server 100 and the search server 200 on a regular basis or according to a traveling amount. Further, the search server 200 transmits route information to the user terminal 10 according to the location information received from the user terminal 10. In other words, the user terminal 10 receives navigation (hereinafter, also referred to as guiding) by receiving route information from the search server 200.

Determining, based on the location information of the user terminal 10, that the user approaches to the traffic intersection to which the guiding flag is set, the guiding server 100 transmits guiding information corresponding to the guiding flag to the user terminal 10. In this case, as the guiding information, an arrow indicating a right turn at the traffic intersection and signboard images of business B and business D existing at corners in a direction to turn are displayed, for example. Here, as the signboard images, images of signboards actually taken as approaching from the same direction are displayed. As seeing the guiding information displayed on the user terminal 10, the user can recognize the signboards of the business B and business D at first sight and find out street R2 to proceed.

When it is determined, based on the location information, that the user approaches the guiding flag, the user terminal 10 switches the display from the guiding information to the route information. Every time the user terminal 10 approaches a guiding flag, the guiding server 100 transmits guiding information corresponding to the guiding flag to the user terminal 10 until the user arrives at the destination and the navigation ends.

In this manner, in the guiding process according to the embodiment, the guiding server 100 stores signboard images, which are photos of signboards, in the image storing unit and retrieves, from the image storing unit, a signboard image of a signboard existing on the route to the destination based on the location information and destination information of the user terminal 10. Further, based on the retrieved signboard image and the location information and the destination information, the guiding server 100 generates guiding information and transmits the guiding information to the user terminal 10 to display on the user terminal 10. This allows, for the user having the user terminal 10, to display signboard images which are relevant to the signboard actually seen by the user on the user terminal 10. The user terminal 10, the guiding server 100, and the search server 200 that execute the above guiding process will be explained in detail.

2. Guiding System

Figure 2:
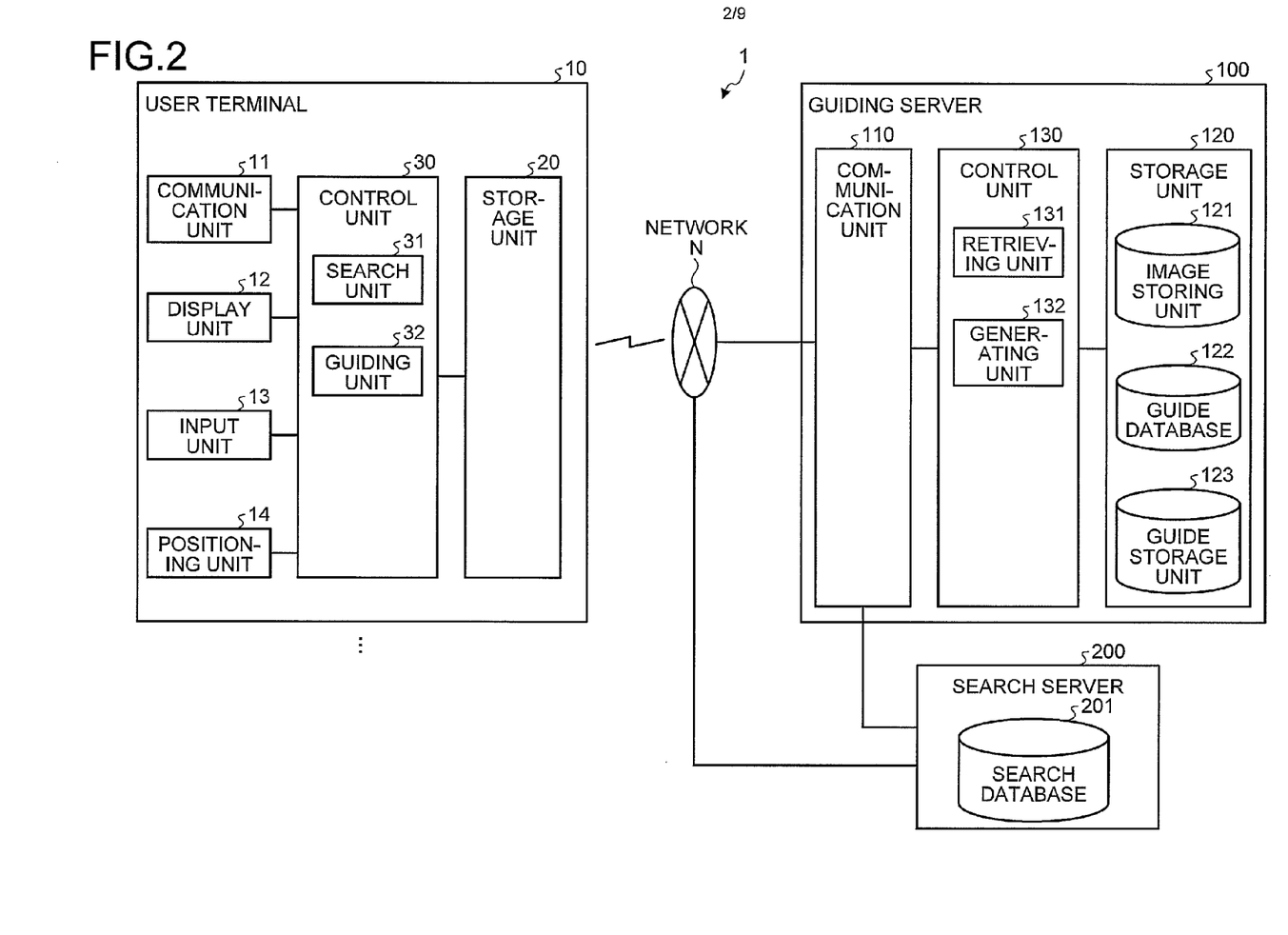
FIG. 2 is a block diagram illustrating a configuration example of a guiding system according to the embodiment.

Next, a guiding system 1 according to the embodiment will be explained with reference to FIG. 2. FIG. 2 is a block diagram illustrating a configuration example of the guiding system 1 according to the embodiment. As illustrated in FIG. 2, the guiding system 1 includes the user terminal 10, the guiding server 100, and the search server 200. The user terminal 10, the guiding server 100 and the search server 200 are communicably connected via a network N in a wired or wireless manner. Further, the guiding server 100 and the search server 200 are communicably connected in a wired or wireless manner. Here, FIG. 2 illustrates an example that the guiding system 1 includes one single user terminal 10; however, the guiding system 1 may include more user terminals 10.

3. Configuration of User Terminal

Next, a configuration of the user terminal 10 will be explained. The user terminal 10 is an information processing device used by a user and may be a mobile phone (for example, smartphone), a PDA (Personal Digital Assistant) and the like, for example. As illustrated in FIG. 2, the user terminal 10 has a communication unit 11, a display unit 12, an input unit 13, a positioning unit 14, a storage unit 20, and a control unit 30.

About Communication Unit 11

The communication unit 11 is realized by a NIC (Network Interface Card) and the like, for example. The communication unit 11 is connected to the guiding server 100 and the search server 200 via the network N and transmits and receives information to and from the guiding server 100 and the search server 200. The communication unit 11 is wirelessly connected to the network N. The wireless connection of the communication unit 11 is realized by a cell phone line and a public wireless LAN (Local Area Network) and the like, for example.

About Display Unit 12 and Input Unit 13

The display unit 12 is a display device for displaying various information. The display unit 12 is realized by a liquid crystal display and the like, for example. The input unit 13 is an input device for receiving various information from a user. For example, the input unit 13 is realized by cursor keys, a numeric keypad, and the like. Here, when the user terminal 10 includes a touch panel, the display unit 12 and the input unit 13 are integrally formed.

About Positioning Unit 14

The positioning unit 14 receives signals from a satellite positioning system. As a satellite positioning system, the positioning unit 14 performs positioning by receiving signals of a global navigation satellite system such as GPS (Global Positioning System), GLONASS (Global Navigation Satellite System), Galileo, Compass, and the like. When positioning is requested by a search unit 31, the positioning unit 14 performs positioning and outputs a positioning result as location information based on a geographical coordinate system such as a WGS (World Geodetic System) 84 and the like. Further, when a continuous positioning is requested by the search unit 31, the positioning unit 14 performs a continuous positioning and continues to output location information until a discontinuation is requested from the search unit 31. Here, as a satellite positioning system, the positioning unit 14 may receive signals from a regional navigational satellite system such as Quasi-Zenith Satellite System, Indian Regional Navigational Satellite System, DORIS (Doppler Orbitography and Radio-positioning Integrated by Satellite), and BeiDou Navigation Satellite System.

When the GPS is used as the satellite positioning system, the positioning unit 14 may use AGPS (Assisted GPS) in order to shorten the time for positioning with the GPS. Further, the positioning unit 14 may use DGPS (Differential GPS) which receives radio waves from a ground-based reference station, in order to improve accuracy of positioning. Further, the positioning unit 14 may perform a VRS-RTK (Virtual Reference Station-Real Time Kinematic) positioning in order to perform positioning even at a location such as an urban area where the sky is obscured.

Further, in a case of a place such as an underground mall where the GPS is not available, the positioning unit 14 may perform positioning by using a base station and the like of a public wireless LAN. For example, the positioning unit 14 can estimate the location of the user terminal 10 by combining one or more of a communication rate, an electric field intensity and the like of each access point, by previously storing the location information of the access point of the public wireless LAN in the storage unit 20 or by receiving the location information from the access point.

About Storage Unit 20

The storage unit 20 is realized by, for example, a semiconductor memory element such as RAM (Random Access Memory), Flash Memory and the like or a memory device such as a hard disk, an optical disk and the like. The storage unit 20 stores information used in a process in the control unit 30.

About Control Unit 30

The control unit 30 is realized by executing a program stored in an internal memory device using RAM as a work area, by a CPU (Central Processing Unit), an MPU (Micro Processing Unit) and the like, for example. Further, the control unit 30 is realized by an integrated circuit such as an ASIC (Application Specific Integrated Circuit), an FPGA (Field Programmable Gate Array) and the like, for example.

As illustrated in FIG. 2, the control unit 30 has the search unit 31 and a guiding unit 32 and realizes or executes functions and behavior of later described information processing. Here, an internal configuration of the control unit 30 is not limited to the configuration illustrated in FIG. 2 and may be other configurations if those configurations can execute the later described information processing.

About Search Unit 31

When a route search request including a destination is input by a user via the input unit 13, the search unit 31 requests a continuous positioning to the positioning unit 14. The search unit 31 transmits a user ID, location information input from the positioning unit 14, and destination information to the search server 200 via the communication unit 11. Further, while the guiding unit 32 is receiving route information from the search server 200 via the communication unit 11, the search unit 31 continues to transmit the user ID and location information, regularly or corresponding to the movement of the user terminal 10, to the search server 200.

About Guiding Unit 32

The guiding unit 32 starts to receive route information from the search server 200 via the communication unit 11 as a result of the route search requested by the search unit 31. The guiding unit 32 displays the received route information on the display unit 12. Further, the guiding unit 32 receives guiding information from the guiding server 100 via the communication unit 11 and displays the information on the display unit 12. Upon receiving end information from the search server 200, the guiding unit 32 ends the navigation (guiding) for the user.

4. Configuration of Guiding Server

Next, a configuration of the guiding server 100 will be explained. The guiding server 100 is a server device for receiving the user ID and route information from the search server 200, generating guiding information to be displayed on the user terminal 10 according to guiding flags set on ways, and delivering the information. As illustrated in FIG. 2, the guiding server 100 includes a communication unit 110, a storage unit 120, and a control unit 130. Here, the guiding server 100 may include an input unit (for example, a keyboard, a mouse and the like) for receiving various operations from an administrator or the like of the guiding server 100 or a display unit (liquid crystal display or the like) for displaying various information.

About Communication Unit 110

The communication unit 110 is realized by a NIC or the like, for example. The communication unit 110 transmits and receives information to and from the user terminal 10 via the network N.

About Storage Unit 120

The storage unit 120 is realized by, for example, a semiconductor memory element such as RAM, Flash Memory and the like or a memory device such as a hard disk, an optical disk and the like. The storage unit 120 includes an image storing unit 121, a guide database 122, and a guide storage unit 123. Further, the storage unit 120 stores an OS (Operating System) and various programs which are executed by the control unit 130 and various data.

About Image Storing Unit 121

Figure 3:
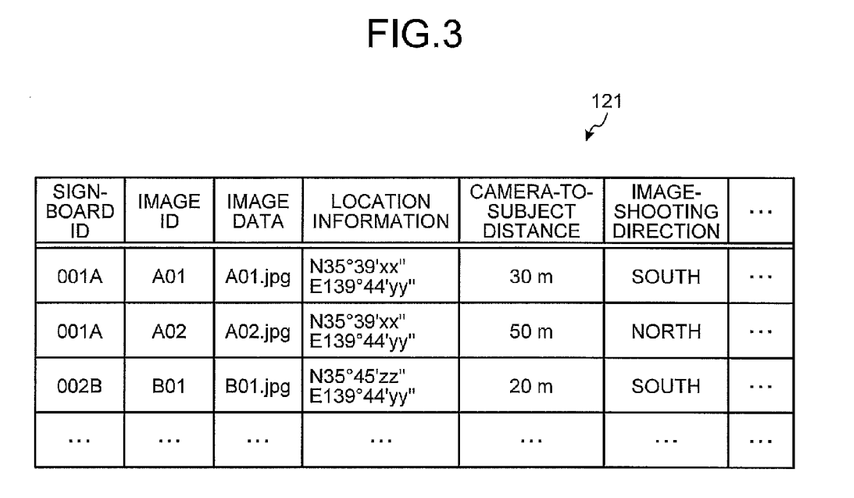
FIG. 3 is an explanatory view illustrating an example of an image storing unit according to the embodiment.

The image storing unit 121 stores signboard images, which are images of actual signboards taken in advance, as signboard images used in guiding information. FIG. 3 is an explanatory view illustrating an example of the image storing unit 121 according to the embodiment. As illustrated in FIG. 3, the image storing unit 121 includes items such as "signboard ID," "image ID," "image data," "location information," "camera-to-subject distance," and "image-shooting direction."

The "signboard ID" identifies signboards. For example, a signboard ID is allocated to a business signboard and identifies the business signboard. Further, the signboard ID may be allocated based on an attribute indicated by the signboard in addition to business. Regarding the signboard ID, a given ID may be allocated to a vicinity guide signboard which does not indicate specific business or a sightseeing signboard such as "Welcome to Michinoku," for example. The "image ID" identifies signboard images. Plural image IDs may be associated with a single signboard ID. Regarding the image ID, for example, image IDs "A01" and "A02" correspond to a signboard ID "001A." Here, for example, the image ID "A01" is a signboard image seeing the signboard from the south and the image ID "A02" is a signboard image seeing the signboard from the north. The "image data" indicate an image file corresponding to the image ID. An image file may be a moving image in addition to a still image. The moving image is, for example, preferable to show a rotating signboard. The "location information" indicates location information of a location where the signboard exists. The "camera-to-subject distance" indicates a distance taken when an image of the signboard image is taken. The "image-shooting direction" indicates which direction the signboard image of a signboard is taken.

About Guide Database 122

Figure 4:
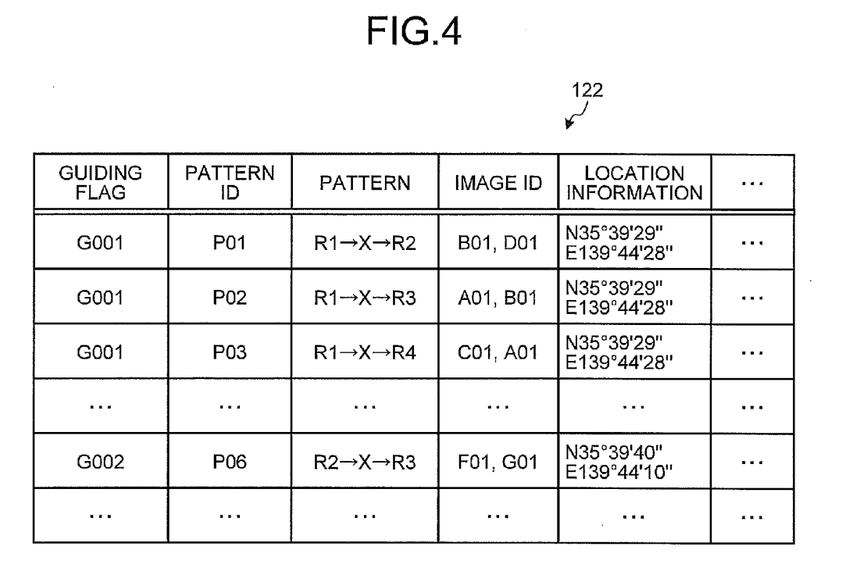
FIG. 4 is an explanatory view illustrating an example of a guide database according to the embodiment.

The guide database 122 stores entering and exiting patterns into and from a guiding flag, an image ID corresponding to each pattern, and location information of the guiding flag, for each guiding flag where guiding information is generated. FIG. 4 is an explanatory view illustrating an example of the guide database 122 according to the embodiment. As illustrated in FIG. 4, the guide database 122 has items such as "guiding flag," "pattern ID," "pattern," "image ID," and "location information."

The "guiding flag" indicates a location to generate guiding information. A guiding flag can be, for example, an intersection of streets, a crossroad in an underground mall, a business which can be a land mark, and the like. Further, the guiding flag may be a location of a signboard itself, for example. The "pattern ID" identifies entering and exiting patterns at a guiding flag. The "pattern" indicates entering and exiting patterns at a guiding flag. A pattern is, for example, expressed as "R1→X→R2" in a case of a traffic intersection X where a guiding flag is set when entering from street R1 and exiting to street R2. The "image ID" indicates a signboard image to be included in guiding information generated in each pattern. The "location information" indicates a location of a guiding flag.

About Guide Storage Unit 123

Figure 5:
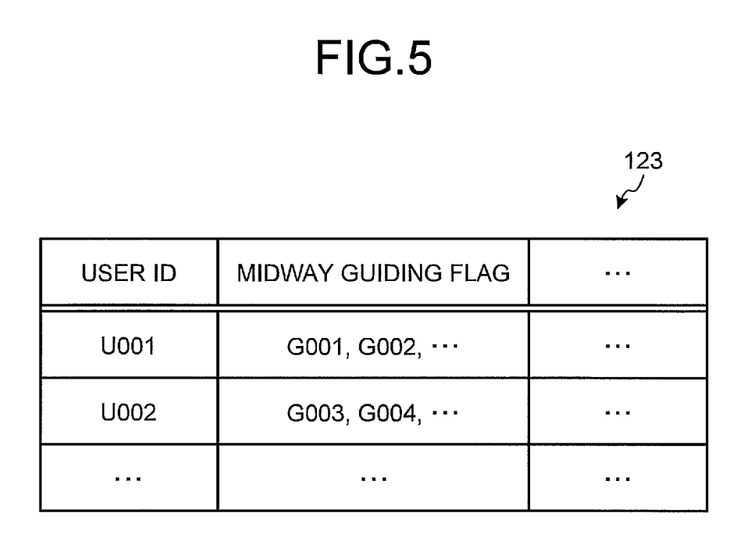
FIG. 5 is an explanatory view illustrating an example of a guide storage unit according to the embodiment.

The guide storage unit 123 stores the user ID of the user terminal 10 to which guiding information is transmitted and a guiding flag existing on the way of route information. FIG. 5 is an explanatory view illustrating an example of the guide storage unit 123 according to the embodiment. As illustrated in FIG. 5, the guide storage unit 123 has items such as "user ID," "midway guiding flag" and the like.

The "user ID" identifies the user terminal 10 to which guiding is being performed. The "midway guiding flag" indicates a guiding flag existing, as a via point, on a way for the user terminal 10 to which guiding is being performed. The midway guiding flag stores guiding flags in the order to be passed by, in a manner of "G001, G002, . . . ," for example.

About Control Unit 130

Returning to the explanation of FIG. 2, the control unit 130 is realized by executing a program stored in an internal memory device using RAM as a work area, by a CPU, an MPU and the like, for example. Further, the control unit 130 is realized by an integrated circuit such as an ASIC, an FPGA or the like, for example.

As illustrated in FIG. 2, the control unit 130 includes a retrieving unit 131 and a generating unit 132, and realizes or executes functions and behavior of later described information processing. Here, an internal configuration of the control unit 130 is not limited to the configuration illustrated in FIG. 2 and may be other configurations if those configurations can execute the later described information processing.

About Retrieving Unit 131

When a user ID and route information are received from the search server 200, the retrieving unit 131 refers to the guide database 122 based on the route information and stores a guiding flag, which the user terminal 10 identified by the user ID passes by, in the guide storage unit 123. The retrieving unit 131 refers to the guide storage unit 123 and the guide database 122 and retrieves, from the image storing unit 121, signboard images of signboards existing on the way to the destination. Here, the route information includes destination information. Further, the retrieving unit 131 may be made to retrieve a signboard image according to the distance between the guiding flag and the user terminal 10 based on the location information of the user terminal 10. Further, the retrieving unit 131 may be made to retrieve a signboard image according to the direction that the user terminal 10 approaches to the guiding flag based on the location information of the user terminal 10. Here, the retrieving unit 131 can retrieve a plurality of signboard images taken at different distances and in different directions based on one or more of the distance and direction between the user terminal 10 and the guiding flag. Further, the retrieving unit 131 can use the location of a signboard as a guiding flag. The retrieving unit 131 stores the image ID of the retrieved signboard image in the guide database 122 and notifies a completion of retrieving to the generating unit 132.

About Generating Unit 132

When the completion of retrieving is notified by the retrieving unit 131, the generating unit 132 refers to the guide storage unit 123 and reads a guiding flag at a via point. Based on the guiding flag to be passed by, the generating unit 132 refers to the guide database 122 and reads the pattern, image ID, location information and the like of the guiding flag. The generating unit 132 generates guiding information including signboard information based on the user ID, location information, destination information of the user terminal 10 and the pattern, image ID, location information of the guiding flag. Here, based on the location information of the user terminal 10 and the guiding flag, the generating unit 132 can generate guiding information with a size-changed signboard image corresponding to the distance between the user terminal 10 and the guiding flag. Further, for example, when the distance between the user terminal 10 and the guiding flag is large, by using plural signboard images, the generating unit 132 can generate guiding information which displays the signboard image of the signboard located in front of the guiding flag larger and displays the signboard image of the signboard located behind the guiding flag smaller. With this, user can easily find, from a distance, the traffic intersection or the like to which the guiding flag is set. Further, for example, when the distance between the user terminal 10 and the guiding flag is small, the generating unit 132 can generate guiding information which displays the signboard image of the signboard in front of the guiding flag smaller and displays the signboard image of the signboard behind of the guiding flag larger. This prevents the user from mistakenly passing though the traffic intersection or the like to which the guiding flag is set.

The generating unit 132 transmits guiding information to the user terminal 10 based on the location information of the user terminal 10. The generating unit 132 generates guiding information corresponding to all guiding flags on the way in advance so that, when the user terminal 10 approaches to each guiding flag, guiding information corresponding to the guiding flag can be transmitted to the user terminal 10. Further, the generating unit 132 may generate and transmit guiding information corresponding to the guiding flag to the user terminal 10 after the user terminal 10 approaches to each guiding flag. In this case, the generating unit 132 may transmit guiding information corresponding to next guiding flag on the way when the user of the user terminal 10 passes by the guiding flag which guiding information is already transmitted. This can reduce the possibility that the user gets lost since guiding information of next guiding flag can be displayed on the user terminal 10, even in a condition that location information of the user terminal 10 cannot temporarily be received due to a communication failure or the like.

5. Configuration of Search Server

Next, a configuration of the search server 200 will be explained. As illustrated in FIG. 2, the search server 200 has a search database 201. The search server 200 executes a route search to a destination based on the location information and destination information.

The search server 200 is connected to the user terminal 10 via the network N and receives a user ID, location information, and destination information from the user terminal 10. The search server 200 is also connected to the communication unit 110 of the guiding server 100 and transmits the user ID of the user terminal 10, for which a route search is being executed, and route information to the guiding server 100. The search server 200 searches a most preferable route from the current location based on location information of the user terminal 10 to a destination. When the user travels on foot, for example, the search server 200 can search a most preferable route for traveling on foot and, when traveling a great distance, the search server 200 can search the use of public transportation such as train and the like. When the user travels by car, for example, the search server 200 can search a most preferable route for traveling by car and can search a route with a consideration of whether to use expressways, information related to traffic jams and the like. The search server 200 starts to transmit the current location, destination information, and route search result such as a route to the user terminal 10 and the guiding server 100 as route information. Further, the search server 200 transmits the user ID of the user terminal 10 to the guiding server 100 to identify the user to whom the navigation is being performed.

Here, the search server 200 receives the user ID and location information from the user terminal 10 regularly or correspondingly to the movement of the user terminal 10. Upon receiving the user ID and location information, the search server 200 transmits corresponding route information to the user terminal 10 so that route information based on updated location information is always transmitted to the user terminal 10. In other words, the search server 200 continuously transmits route information to the user terminal 10. Upon receiving location information of the destination from the user terminal 10, the search server 200 generates end information which indicates an end of the navigation. The search server 200 transmits the user ID and end information to the guiding server 100 and transmits the end information to the user terminal 10.

About Search Database 201

The search database 201 stores information such as streets, underground malls, railroads and the like. The information of streets includes street types, locations, connected streets, traffic intersections, buildings along streets, names of places, and the like. The search database 201 also stores a map to be displayed on the user terminal 10. The map is stored, for example, in a raster format and a vector format. The map in a raster format includes a raster map image and a list of latitude and longitude coordinates. The map in a vector format has a layered structure in each section and includes information such as streets, borders of municipalities, riverine systems, railroads, points of interest, parks, buildings, names of places and the like.

6. Guiding Process

Figure 6:
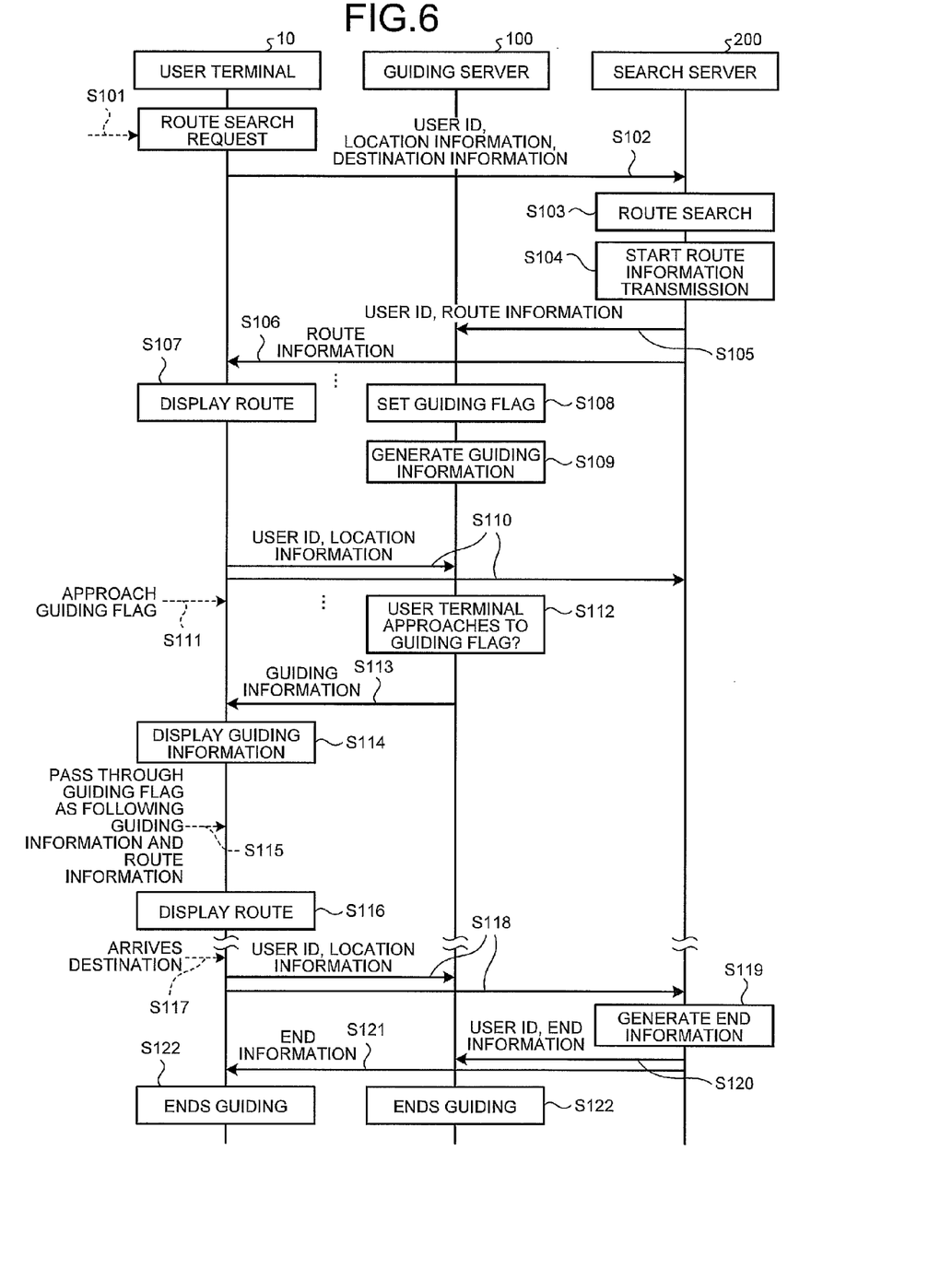
FIG. 6 is a sequence diagram illustrating an example of navigation by a guiding system according to the embodiment.

Next, a guiding process by the guiding system 1 according to the embodiment will be explained. FIG. 6 is a sequence diagram illustrating an example of navigation by the guiding system 1 according to the embodiment.

Firstly, the user operates the user terminal 10 and performs a route search request by inputting a destination (step S101). When the destination is input and the route search request is performed, the search unit 31 of the user terminal 10 requests a continuous positioning to the positioning unit 14. The search unit 31 transmits the user ID, the location information output from the positioning unit 14, and the destination information to the search server 200 via the communication unit 11 (step S102).

Upon receiving the user ID, location information and destination information, the search server 200 searches a most preferable route to the destination from the current location based on the location information (step S103). The search server 200 starts to transmit the result of the route search, as route information, to the user terminal 10 and the guiding server 100 (step S104). The search server 200 transmits the user ID of the user terminal 10 and the route information to the guiding server 100 (step S105). Further, the search server 200 transmits the route information to the user terminal 10 (step S106).

Upon starting the reception of the route information from the search server 200, the guiding unit 32 of the user terminal 10 displays the received route information on the display unit 12 (step S107). Upon receiving the user ID and the route information, the retrieving unit 131 and the guiding server 100 refers to the guide database 122 based on the route information and sets a guiding flag which the user terminal 10 identified by the user ID passes by as a via point by storing the guiding flag in the guide storage unit 123 (step S108). The retrieving unit 131 refers to the guide storage unit 123 and the guide database 122 and retrieves, from the image storing unit 121, a signboard image of the signboard existing on the way to the destination. The retrieving unit 131 stores the image ID of the retrieved signboard image in the guide database 122 and notifies a search completion to the generating unit 132.

When the search completion is notified from the retrieving unit 131, the generating unit 132 refers to the guide storage unit 123 and reads the guiding flag which is to be passed by as a via point. Based on the guiding flag to be passed by as a via point, the generating unit 132 refers to the guide database 122 and reads a pattern, an image ID, location information and the like of the guiding flag. Based on the user ID, location information, and destination information of the user terminal 10, and the pattern, image ID, location information and the like of the guiding flag, the generating unit 132 generates guiding information including signboard information (step S109).

The user terminal 10 starts to transmit the user ID and location information to the guiding server 100 and the search server 200 regularly or when the user starts to move (step S110). When the user having the user terminal 10 approaches to the guiding flag (step S111), the generating unit 132 of the guiding server 100 determines that the user terminal 10 approaches to the guiding flag based on the location information of the user terminal 10 (step S112). Upon determining that the user terminal 10 approaches to the guiding flag, the generating unit 132 transmits guiding information to the user terminal 10 (step S113). The user terminal 10 displays the received guiding information on the display unit 12 (step S114).

Figure 7:
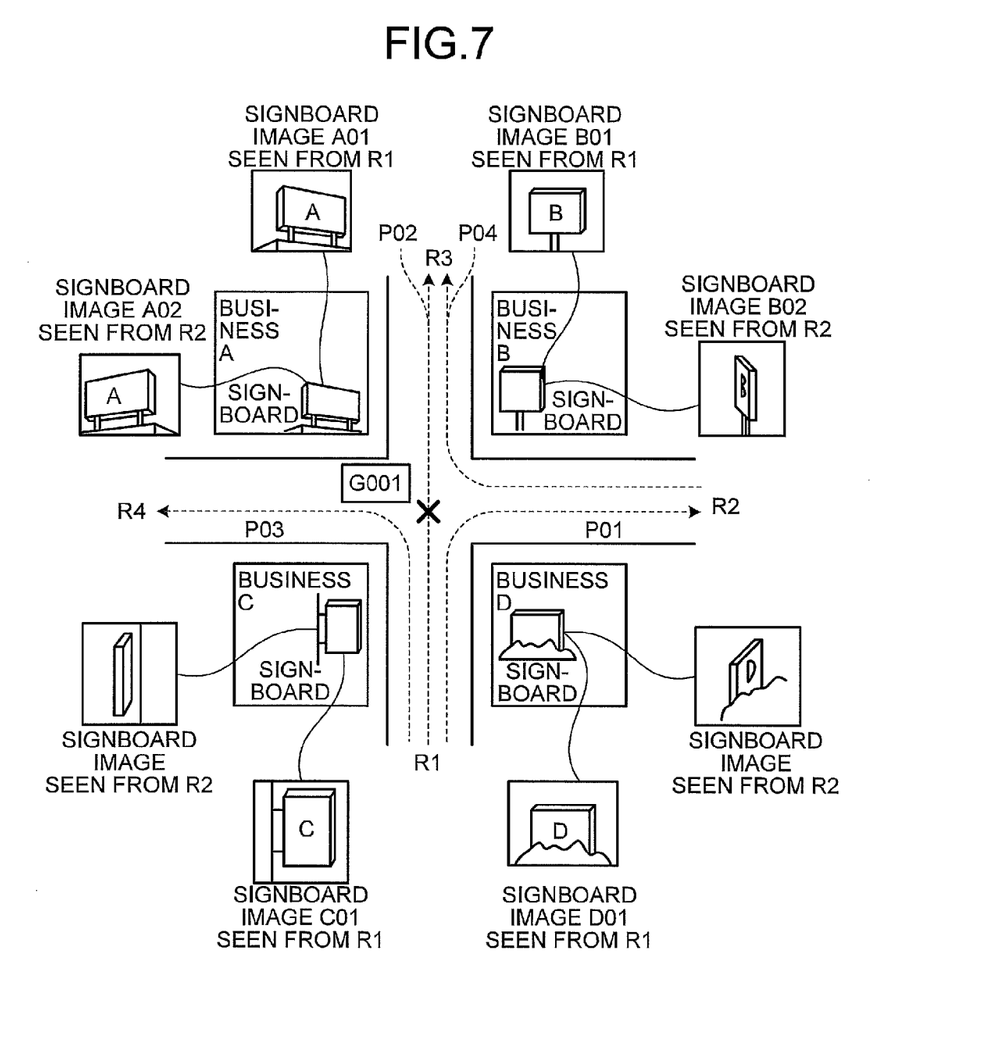
FIG. 7 is an explanatory view illustrating an example of a traffic intersection to which a guiding flag is set.

Here, referring to FIG. 7, an example of a traffic intersection to which a guiding flag is set and corresponding guiding information will be explained. FIG. 7 is an explanatory view illustrating an example of a traffic intersection to which a guiding flag is set. In the example of FIG. 7, a guiding flag G001 is set at the center of a traffic intersection X. Further, at four corners of the traffic intersection X, there are businesses A, B, C and D. Further, the streets that enter and exit to and from the traffic intersection X are explained as streets R1, R2, R3 and R4.

The user having the user terminal 10 is traveling on the street R1 upward from the bottom in FIG. 7. Firstly, a case that the user makes a right turn at the traffic intersection X will be explained. The user enters from the street R1 into the traffic intersection X and exits to the street R2. This is referred to as a pattern ID "P01." In this case, the user can uses the signboards of the business B and business D as landmarks to find the street R2 to make a right turn. Thus, the guiding information can be guiding information including at least one of a signboard image B01 seen from the street R1 and a signboard image D01 seen from the street R1. In this case, regarding the signboard images B01 and D01, the size of those signboard images may be changed according to the distance between the signboards and the user terminal 10.

Next, when the user travels straight through the traffic intersection X, the user enters from the street R1 into the traffic intersection X and exits to the street R3. This is referred to as a pattern ID "P02." In this case, the user can use the signboards of the business A and business B as landmarks to see if it is the place to pass through. Thus, the guiding information can be guiding information including at least one of the signboard image A01 seen from the street R1 and the signboard image B01 seen from the street R1.

Further, when the user makes a left turn at the traffic intersection X, the user enters from the street R1 into the traffic intersection X and exits to the street R4. This is referred to as a pattern ID "P03." In this case, the user can use the signboards of the business A and business C as landmarks to find the street R4 to make a left turn. Thus, the guiding information can be guiding information including at least one of the signboard image A01 seen from the street R1 and the signboard image C01 seen from the street R1.

Subsequently, an example that the user having the user terminal 10 proceeds on the street R2 from the right in FIG. 7 to the left in FIG. 7 will be explained. The user enters from the street R2 into the traffic intersection X and exits to the street R3. This is referred to as a pattern ID "P04." In this case, the user can use the signboards of the business A and business B as landmarks to find the street R3 to make a right turn. Thus, the guiding information can be guiding information including at least one of the signboard image A02 seen from the street R2 and the signboard image B02 seen from the street R2. In other words, the user uses the signboard of the business B as a landmark both in the case of entering from the street R1 into the traffic intersection X and exiting to the street R2 and the case of entering from the street R2 into traffic intersection X and exiting to street R3. However, the signboard of the business B seen from the street R1 and the signboard of the business B seen from the street R2 look different in general. Thus, the signboard images which are photos of the signboard are signboard images taken from different directions. With this configuration, the user can see guiding information including signboard images which look the same as images actually seen at the location.

Returning to the explanation of FIG. 6, the user having the user terminal 10 passes though the guiding flag according to the route information and guiding information (step S115). When determining that the user passes though the guiding flag based on the location information that the positioning unit 14 positions and outputs, the user terminal 10 switches the display from the guiding information to the route information (step S116). After that, when the user arrives at the destination (step S117), the user terminal 10 transmits the user ID and location information to the guiding server 100 and the search server 200 (step S118).

Upon receiving the user ID and the location information, the search server 200 generates end information since the location information and the destination information indicate substantially the same location (step S119). The search server 200 transmits the user ID and the end information to the guiding server 100 (step S120). The search server 200 also transmits the end information to the user terminal 10 (step S121). Upon receiving the user ID and the end information, the guiding server 100 ends guiding to the user ID and deletes information related to the user ID from the guide storage unit 123. Further, upon receiving the end information, the user terminal 10 ends the navigation (guiding) for the user (step S122).

7. Effect

In this manner, the guiding server 100 stores a signboard image which is a photo of a signboard in an image storing unit, retrieves, from the image storing unit, a signboard image of a signboard existing on a way to a destination based on location information and destination information of the user terminal 10, and generates guiding information including the signboard image based on the retrieved signboard image and the location information and destination information to transmit to the user terminal 10. With this configuration, the guiding server 100 can display, on the user terminal 10, the signboard image which looks the same as the signboard actually seen by the user.

Further, upon determining that the user terminal 10 approaches to the signboard based on the location information, the guiding server 100 transmits guiding information to the user terminal 10. With this configuration, when the user terminal 10 approaches to the signboard, the guiding server 100 can display, on the user terminal 10, the signboard image which looks the same as the signboard actually seen by the user.

Further, the guiding server 100 generates, as guiding information, guiding information in which the size of signboard image is changed according to the distance between the signboard and the user terminal 10. With this configuration, since the guiding server 100 changes the size of the signboard image according to the distance of the signboard and the user terminal 10, the signboard image which looks the same as the signboard actually seen by the user can be displayed on the user terminal 10.

Further, the guiding server 100 generates, as guiding information, guiding information, in which plural signboard images are included and the size of each signboard image is changed according to the distance between the signboard and the user terminal 10. With this, the guiding server 100 can display, on the user terminal 10, guiding information that helps the user easily find the signboard from a distance. Further, the guiding server 100 can display, on the user terminal 10, guiding information that prevents the user from mistakenly passing through the signboard.

Further, the guiding server 100 stores, as signboard images, the signboard images which are taken from different directions and retrieves, as the signboard image, a signboard image corresponding to the distance between the signboard and the user terminal 10. With this configuration, the guiding server 100 can display, on the user terminal 10, a signboard image including surrounding environment of the signboard, which is not a single signboard image simply enlarged or reduced.

Further, when the user of the user terminal 10 passes through the signboard for which guiding information is generated on the way, the guiding server 100 transmits, as guiding information, next guiding information on the way. With this configuration, even in a condition that the guiding server 100 cannot receive the location information of the user terminal 10 temporarily due to a communication failure or the like, the user terminal 10 can display guiding information for the next signboard.

Further, the guiding server 100 generates, as guiding information, guiding information in which the signboard image is a moving image. With this, the guiding server 100 can display, on the user terminal 10, a signboard image which is further similar to the signboard seen by the user in the actual location.

Further, the guiding server 100 associates and stores, as signboard images, respective images seen from different directions and the directions from which the respective images are seen by associating them with each signboard, and retrieves, as a signboard image, a signboard image according to the direction from which the user terminal 10 approaches to the signboard. With this configuration, the guiding server 100 can display, on the user terminal 10, a signboard image corresponding to the shape of the signboard seen from the user.

8. Others

Figure 8A:
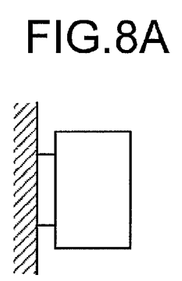
FIGS. 8A to 8C are explanatory views illustrating examples of mounting manners of a signboard.
Figure 8B:
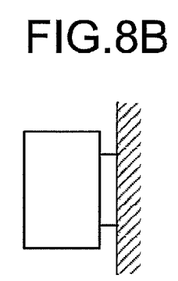
Figure 8C:
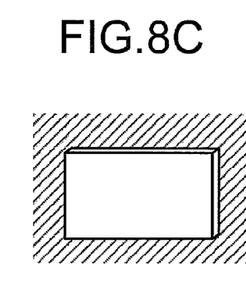

Here, referring to FIGS. 8A to 8C, the signboard image seen from different directions and the directions from which the respective images are seen regarding a single signboard will be explained. FIGS. 8A to 8C are explanatory views illustrating examples of manners of mounting a signboard. FIG. 8A is an example of a signboard mounted projectingly from a building on the left. FIG. 8B illustrates the same signboard of FIG. 8A and the building is on the right. In other words, FIG. 8B is an example of the signboard seen when a user turns around and sees the signboard of FIG. 8A after passing by. In short, although the signboard of FIGS. 8A and 8B are the same signboard, the relation with the building differs according to the direction from which the user approaches to the signboard. In this case, the guiding server 100 stores, as a signboard image, signboard images of FIGS. 8A and 8B for a single signboard, by associating with the directions approaching to the signboard respectively. The guiding server 100 determines from which direction the user approaches to the signboard based on the location information of the user terminal 10 and includes the signboard image of the direction seen from the user in the guiding information. Here, the respective faces of the signboard illustrated in FIGS. 8A and 8B may display the signboard of the same business F or may display signboards of different businesses, for example. At a place where businesses are concentrated such as an underground mall, for example, the signboards are often placed at a border of businesses and the businesses displayed on the respective faces are different. In such a case, by associating the orientation of the signboard with the content of the signboard, the signboard image of the guiding information can be changed according to the direction from which the user approaches to the signboard. With this, even with the same signboard, the guiding server 100 can display, on the user terminal 10, guiding information including the signboard image with surround environment which looks the same as seen from the user. Further, regarding signboards at a place such as an underground mall, there are signboards flatly mounted on a wall as illustrated in FIG. 8C. The signboard as illustrated in FIG. 8C is sometimes mounted at an end of a T-shaped intersection in an underground mall or the like, for example. In this case, the signboard is preferable as a landmark since it stands out when seen from the street that ends at the T-shaped intersection.

Figure 9:
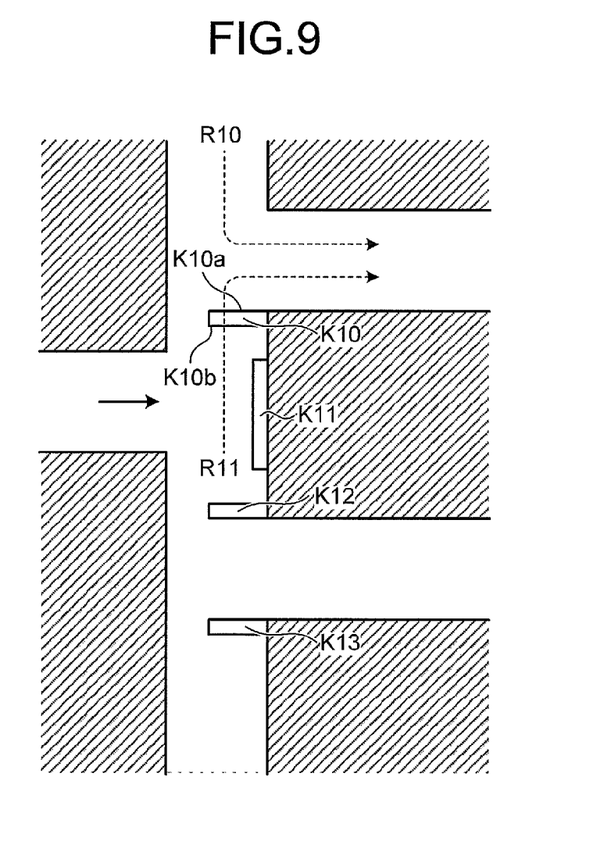

FIG. 9 is an explanatory view illustrating an example of mounting a signboard located in an underground mall or the like. For example, it is assumed that a user travels along a route R10. In this case, the user can see a face K10a of a signboard K10, a signboard K12 and a signboard K13. Based on the location information of the user terminal 10, the guiding server 100 generates guiding information including a signboard image of the face K10a of the signboard K10 and transmits the image to the user terminal 10. Then, on the user terminal 10 held by the user, the guiding information including the signboard image of the face K10a of the signboard K10 is displayed. Here, the signboard image is a signboard image in a manner illustrated in FIG. 8A. As following the guiding information, the user makes a left turn at a pathway before the signboard K10. Subsequently, it is assumed that the user moves along a route R11. Then, the user can see a face K10b of the signboard K10. Based on the location information of the user terminal 10, the guiding server 100 generates guiding information including a signboard image of the face K10b of the signboard K10 and transmits the guiding information to the user terminal 10. Then, on the user terminal 10 held by the user, the guiding information including the signboard image of the face K10b of the signboard K10 is displayed. Here, the signboard image is in a signboard image in a manner illustrated FIG. 8B. Further, as another example, when it is assumed that the user moves from the left pathway in FIG. 9, the user can see a signboard K11 straight ahead. Based on the location information of the user terminal 10, the guiding server 100 generates guiding information including a signboard image of the signboard K11 and transmits the guiding information to the user terminal 10. Then, on the user terminal 10 held by the user, the guiding information including the signboard image of the signboard K11 is displayed. Here, the signboard image is a signboard image in a manner illustrated in FIG. 8C.

Figure 10:
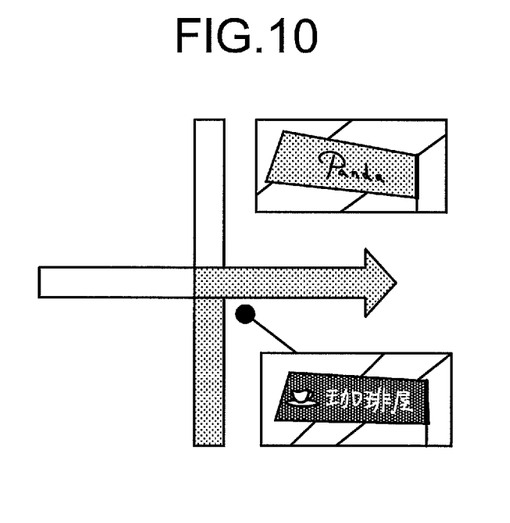
FIG. 10 is an explanatory view illustrating an example of a case of making a right turn at a pathway between businesses in front and back of a crossroad in an underground mall.
Figure 11:
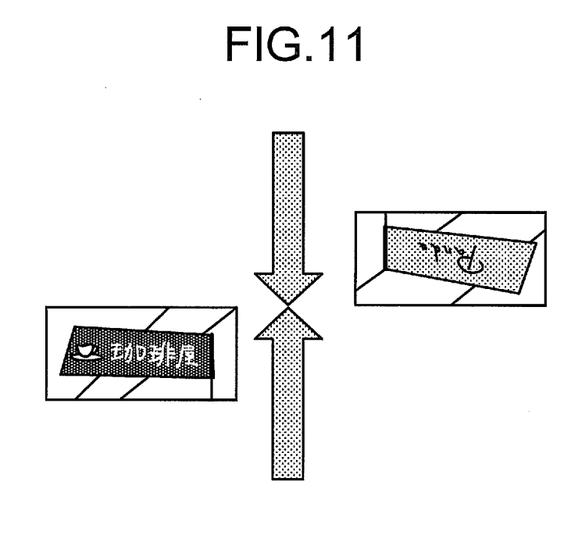
FIG. 11 is an explanatory view illustrating an example of displaying different signboard images corresponding to a route direction.

FIG. 10 is an explanatory view illustrating an example of a case of making a right turn at a pathway between businesses located in front of and behind a crossroad in an underground mall. In the example of FIG. 10, the guiding server 100 sets guiding data, which is a guiding flag, at the crossroads. Based on the location information of the user terminal 10, the guiding server 100 generates guiding information for making a right turn at the pathway between a coffee shop in front and a sweets shop in back and transmits guiding information to the user terminal 10. Then, on the user terminal 10, the generated guiding information for making a right turn at the pathway between the coffee shop in front and the sweets shop in back is displayed. Further, FIG. 11 is an explanatory view illustrating an example of displaying different signboard images according to a direction of the way. In the example of FIG. 11, to a user terminal 10 of a user moving from the bottom, the guiding server 100 generates and transmits guiding information including a signboard image of a coffee shop based on the location information. Then, on the user terminal 10 of the user moving from the bottom, the guiding information including the signboard image of the coffee shop is displayed. Further, to a user terminal 10 of a user moving from the above, the guiding server 100 generates and transmits guiding information including a signboard image of a sweets shop based on the location information. Then, on the user terminal 10 of the user moving from the above, the guiding information including the signboard image of the sweets shop is displayed.

Figure 12:
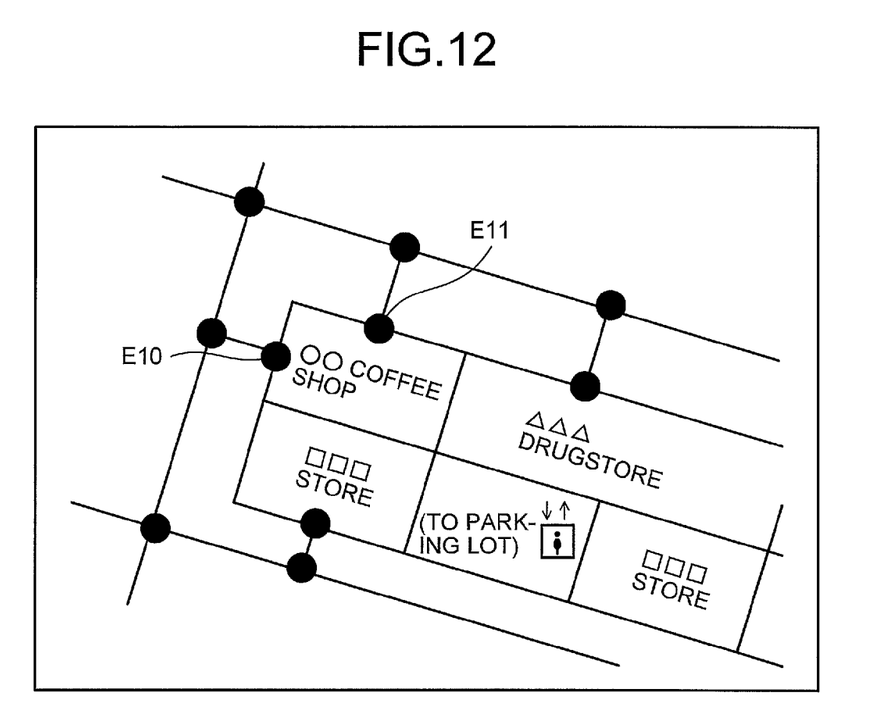
FIG. 12 is an explanatory view illustrating an example of a case that a business has more than one entrances.

FIG. 12 is an explanatory view illustrating an example of a case in which a business has more than one entrance. For example, when a user comes to an underground mall using an elevator from a parking lot, the guiding server 100 shows a route, as a route to "○○ coffee shop," heading to an entrance E10 of ○○ coffee shop after making a right turn at the corner of "□□□ store." The guiding server 100 generates guiding information for making a right turn after a right turn at the corner of "□□□ store" to enter ○○ coffee shop via the entrance E10 and transmits the guiding information to the user terminal 10. On the display unit 12 of the user terminal 10, the guiding information for making a right turn after a right turn at the corner of "□□□ store" to enter ○○ coffee shop via the entrance E10. Further, when the user heads to "○○ coffee shop" from the side of "△△△ drugstore," for example, the guiding server 100 shows a route for making a left turn just after passing by "△△△ drugstore" to head to the entrance E11 of ○○ coffee shop. The guiding server 100 generates guiding information for making a left turn just after passing by "△△△ drugstore" to head to the entrance E11 of ○○ coffee shop and transmits guiding information to the user terminal 10. On the display unit 12 of the user terminal 10, guiding information for making a left turn just after passing by "△△△ drugstore" to head to the entrance E11 of ○○ coffee shop is displayed.

Further, in the above embodiment, an operation at a traffic intersection to which a single guiding flag is set has been explained; however, the number of the guiding flag is not limited to one. Steps from S110 to S116 in FIG. 6 are repeated every time each guiding flag is passed by. At each guiding flag, the guiding server 100 transmits corresponding guiding information to the user terminal 10.

Further, regarding the above described guiding server 100, the guiding information has been explained to be guiding information including at least one of the signboard image B01 seen from the street R1 and the signboard image D01 seen from the street R1; however, it is not limited by this. For example, in the guiding information, the distance between the user terminal 10 and the signboard is calculated based on the location information of the user terminal 10 and the signboard, and the ratio of the sizes of the signboard images B01 and D01 can be changed, based on the distance, so that those images become the same images as the user sees the signboards of the business B and business D from the street R1 respectively.

Further, the above described guiding server 100 changes, in guiding information, the size of the signboard image, which is the signboard image B01 or D01 according to the distance between the signboard and the user terminal 10; however, it is not limited by this. For example, considering the distance between the traffic intersection X and the user, at a point away from the traffic intersection X, the user proceeding on the street R1 can easily see the signboard of the business D which is close to the user. Further, at a point close to the traffic intersection X, it is necessary that the user pays an attention to the signboard of the business B which is further than the business D so as not to mistakenly pass through the traffic intersection X. Thus, based on the location information of the user terminal 10 and the traffic intersection X (the signboard), the guiding server 100 generates and transmits, as guiding information, guiding information to the user terminal 10 to display the signboard image of the business D larger at the point the user is away from the traffic intersection X and displays the signboard image of the business B larger at the point the user is close to the traffic intersection X. The user terminal 10 can display the signboard image of the business D larger at the point the user is away from the traffic intersection X and display the signboard image of the business B larger at the point the user is close to the traffic intersection X.

Further, the above described guiding server 100 has been described so as to display the signboard images as guiding information; however, it is not limited by this. For example, as guiding information, when the signboard cannot be seen because of a structure of streets, it may display why the signboard cannot be seen. For example, when a tree on the street in front covers a signboard and the signboard cannot be seen, the guiding server 100 generates guiding information in which the tree in front is transparently displayed as overlapping and blinking on the signboard image and transmits the guiding information to the user terminal 10. This can prevent that the user cannot find the signboard and gets lost. Here, for example, the guiding server 100 can generate a guiding image that displays in the same manner in a case of a place such as an underground mall where signboards of many businesses overlap on each other.

Further, the above described guiding server 100 uses a photo image as a signboard image; however, it is not limited by this example. For example, with cooperation of facilities such as businesses and the like, photos of signboards with actual size information, image data for making a signboard, or the like can be introduced. With this configuration, guiding information can be generated using signboard images with more accurate sizes and designs.

Further, the above described guiding server 100 may use a signboard image to which seasonally changing decoration is applied. For example, based on date and time information, the guiding server 100 may use a signboard image of a signboard to which decoration is applied for an event such as Christmas holiday sale and the like before Christmas season. With this, even in a place such as an underground mall where the scenery significantly changes in each season, guiding information with preferable signboard images can be provided to a user.

Further, the above described guiding server 100 may be realized by a plurality of server computers or may be realized by a single server computer. Further, the configuration can be flexibly changed, such that some functions are realized by calling an external platform or the like via an API (Application Programming Interface) or network computing.

Further, the "unit" used in the claims can be read as "section," "module," or "circuit." For example, a retrieving unit can be read as a retrieving section or a retrieving circuit.

The guiding server according to this application can display, on the user terminal, a signboard image which looks the same as the signboard actually seen by the user.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A guiding server comprising:
a memory configured to store a first signboard image of a first signboard indicating a first business; and
a processor programmed to:
retrieve, from the memory, the stored first signboard image of the first signboard based on (i) a location information of a user terminal with respect to the location information of the first signboard, and (ii) a destination information of the user terminal received from the user terminal, which is different than the location information of the first signboard,
generate guiding information based on the retrieved first signboard image, the location information and the destination information, the generated guiding information including, when a way to a destination includes a turn to a one side at a crossing, (i) the stored first signboard image of the first signboard at the crossing on a right side of the user terminal and a second signboard image of a second signboard indicating a second business on a left side of the user terminal after the turn to the one side, and (ii) information indicating that the way to the destination is between the first signboard and the second signboard, wherein the first signboard image and the second signboard image are similar to the first signboard and the second signboard located at the crossing location, and
transmit and display the guiding information on the user terminal.

2. The guiding server according to claim 1, wherein the processor transmits the generated guiding information to the user terminal when the processor determines that the user terminal is approaching the first signboard based on the location information.

3. The guiding server according to claim 1, wherein the processor generates guiding information in which a size of the first signboard image is changed according to a distance between the first signboard and the user terminal.

4. The guiding server according to claim 1, wherein the processor generates guiding information in which a plurality of signboard images of the first signboard is included and sizes of the plurality of signboard images are changed to different sizes according to a distance between the first signboard and the user terminal.

5. The guiding server according to claim 1, wherein
the image memory stores a plurality of signboard images of the first signboard taken at different distances, and the processor retrieves a signboard image of the plurality of signboard images according to the distance between the first signboard and the user terminal.

6. The guiding server according to claim 1, wherein when the user terminal passes by the first signboard for which the guiding information on the way is generated, the processor transmits next guiding information on the way.

7. The guiding server according to claim 1, wherein the processor generates guiding information in which the first signboard image is a moving image.

8. The guiding server according to claim 1, wherein
the memory stores a plurality of signboard image as associating with images taken from different directions and the directions of the respective images for the first signboard; and
the processor retrieves one of the plurality of signboard images corresponding to the direction from which the user terminal approaches to the first signboard.

9. The guiding server according to claim 1, wherein the processor generates guiding information including the first signboard image by changing a display form of the first signboard image depending on a date that the first signboard image is retrieved.

10. A guiding method of a computer performing:
storing, in a memory, a first signboard image of a first signboard it indicating a first business;
retrieving, from the memory, the first signboard image of the first signboard based on: (i) a location information of a user terminal with respect to the location information of the first signboard, and (ii) a destination information of the user terminal received from the user terminal, which is different than the location information of the first signboard;
generating guiding information based on the retrieved first signboard image, the location information and the destination information, the generated guiding information including, when a way to a destination includes a turn to a one side at a crossing, (i) the stored first signboard image of the first signboard at the crossing on a right side of the user terminal and a second signboard image of a second signboard indicating a second business on a left side of the user terminal after the turn to the one side, and (ii) information indicating that the way to the destination is between the first signboard and the second signboard, wherein the first signboard image and the second signboard image are similar to the first signboard and the second signboard located at the crossing location; and
transmitting and displaying the guiding information on the user terminal.

11. A non-transitory recording medium storing a guiding program causing a computer to perform:
storing, in a memory, a first signboard image of a first signboard indicating a first business;
retrieving, from the memory, the first signboard image of the first signboard based on: (i) a location information of a user terminal with respect to the location information of the first signboard, and (ii) a destination information of the user terminal received from the user terminal, which is different than the location information of the first signboard;
generating guiding information based on the retrieved first signboard image, the location information and the destination information, the generated guiding information including, when a way to a destination includes a turn to a one side at a crossing, (i) the stored first signboard image of the first signboard at the crossing on a right side of the user terminal and a second signboard image of a second signboard indicating a second business on a left side of the user terminal after the turn to the one side, and (ii) information indicating that the way to the destination is between the first signboard and the second signboard, wherein the first signboard image and the second signboard image are similar to the first signboard and the second signboard located at the crossing location; and
transmitting and displaying the guiding information on the user terminal.

\* \* \* \* \*